Oct. 21, 1969    D. SILVERMAN    3,474,404
SEISMIC SURVEYING USING TRUNCATED MONOFREQUENCY WAVE TRAINS
Filed Oct. 28, 1968    2 Sheets-Sheet 1

INVENTOR.
DANIEL SILVERMAN
BY Newell Potter
ATTORNEY

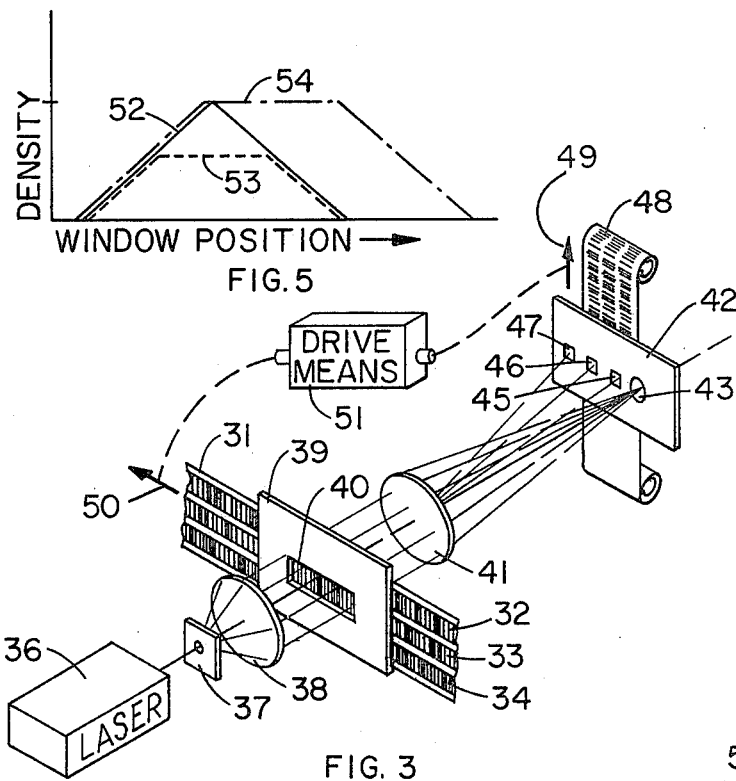
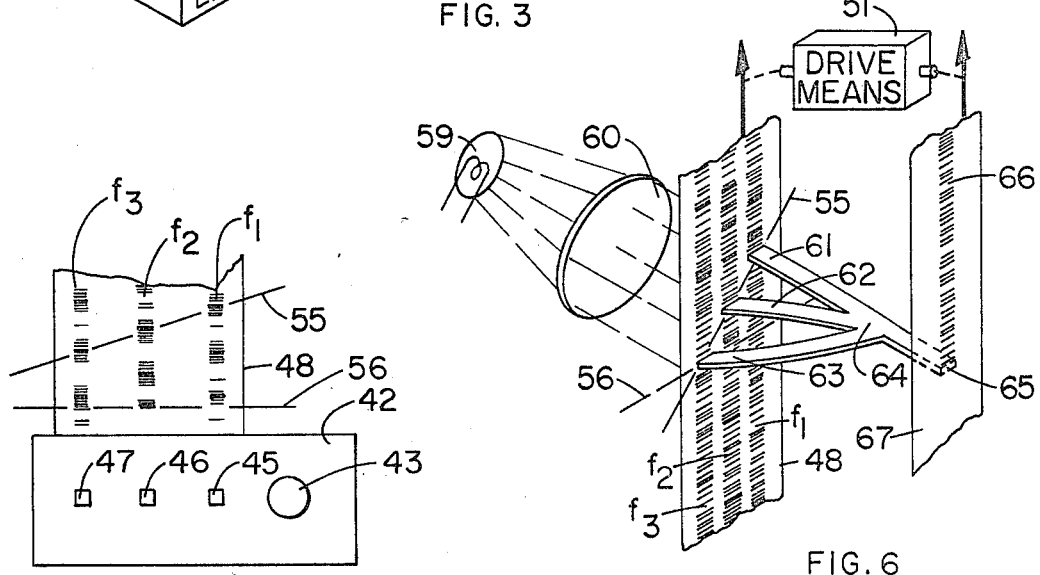

United States Patent Office 3,474,404
Patented Oct. 21, 1969

3,474,404
SEISMIC SURVEYING USING TRUNCATED MONO-FREQUENCY WAVE TRAINS
Daniel Silverman, Tulsa, Okla., assignor to Pan American Petroleum Corporation, Tulsa, Okla., a corporation of Delaware
Filed Oct. 28, 1968, Ser. No. 771,204
Int. Cl. G01v 1/02
U.S. Cl. 340—15.5                    10 Claims

ABSTRACT OF THE DISCLOSURE

In seismic geophysical surveying, using a vibrator to generate monofrequency truncated seismic wave trains, the detected waves are recorded as a variable-density trace for each seismometer (group) position, which trace is analyzed by passing parallel monochromatic light through a window scanning along the trace and equal in length to a truncated wave train at the recorded-trace scale. The transmitted and diffracted light is focused into a Fourier transform where a pinhole mask passes only light corresponding to the specific input monofrequency (or frequencies, where several different ones are used simultaneously or in sequence) to an intensity measuring or recording element, the output of which is plotted as a function of window position along the trace corresponding to wave-travel time. Successive intensity maxima indicate successive arrivals of wave forms, such as reflections, from which travel times can be derived.

Background of the invention

This invention relates to seismic geophysical surveying utilizing truncated monofrequency seismic wave trains introduced into the earth by a vibrator, sonic source, or the like, and is directed particularly to the analysis of the resulting received waves for their travel times by various paths through the earth. Specifically, the present invention is directed to optically analyzing variable-density traces of received truncated monofrequency wave trains so as to show travel times of the seismic waves by various paths through the earth from the source to the receiver.

There have been a number of proposals and some systems developed for using truncated constant-frequency seismic wave trains for geophysical surveying purposes, but a frequent difficulty with such systems has been the analysis of the received waves for travel times through the earth. Where the frequencies of the different trains are related in accordance with terms of a Fourier series, summation of the received waves is one way of determining travel times, provided the time-phase relationships of the different waves being summed can be adjusted to place only one peak of each of the different frequencies in phase, leaving the remaining portions of the wave trains to cancel each other. Such superposition of the wave forms is at times difficult to accomplish with sufficient accuracy, trial and error or a number of approximations frequently being necessary to obtain the best superposition of a single peak.

Correlation techniques, which work well with non-repetitive wave forms for which the frequency varies in a continuous manner during transmission, do not work well for monofrequency truncated waves, as the cross correlation of two sine waves is another sine wave such that the central peak of the correlation function may be difficult to distinguish from the side lobes. It is, accordingly, the primary object of the present invention to analyze the returning wave forms of truncated-wave input seismic signals with minimum sensitivity to the relative time phase of the different signals and without the complex processing steps involved in using correlation functions.

Summary of the invention

In accordance with the present invention, the travel times through the earth of truncated monofrequency wave trains of similar duration and typically from three to ten cycles in length, and preferably of a plurality of such wave trains of different monofrequencies, are determined by recording the received waves as corresponding variable-density traces, optically producing the Fourier transform of a length of each of said traces corresponding to any one monofrequency input signal length, and recording an indication of the varying intensity in said transform of each specific input frequency as a function of the position of the scanned interval along each recorded trace.

Brief description of the drawings

This will be better understood by reference to the accompanying drawings forming a part of this application and illustrating certain preferred and alternative embodiments of the invention. In these drawings.

FIGURE 3 is a schematic view of an optical system for analyzing records made according to the invention;

FIGURE 4 is a detailed schematic view of the frequency-analyzing mask and record produced by it;

FIGURE 5 is a graphical representation of the relation of window length to monofrequency signal duration; and FIGURE 6 is a diagrammatic view of an alternative form of final recording means.

Description of the preferred embodiment(s)

Figure 1:
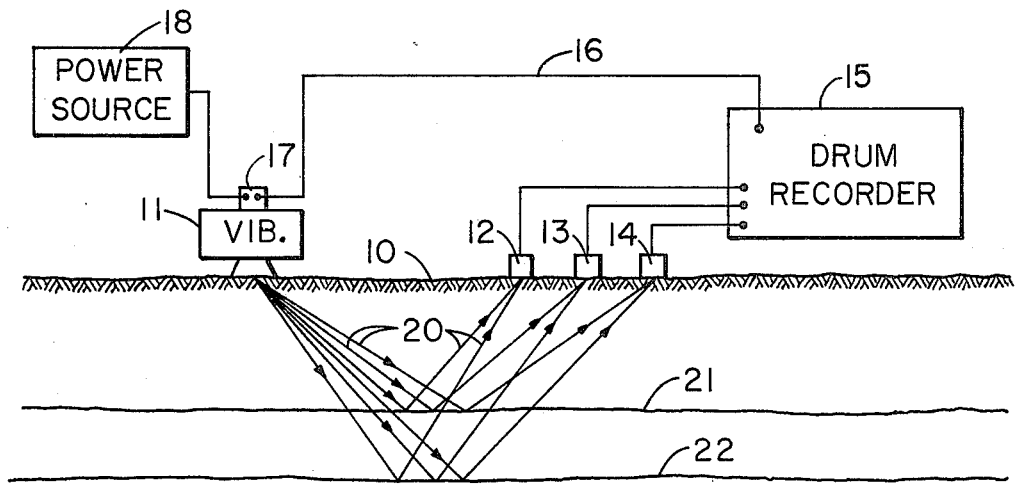
FIGURE 1 is a diagrammatic cross section of a field setup for making records to be analyzed according to the invention.

Referring now to the drawings in detail and particularly FIGURE 1 thereof, this figure shows diagrammatically in cross section a field data-recording setup. Spaced some distance apart at the earth's surface 10 are a seismic vibrator source 11 and detectors 12, 13 and 14, respectively connected by insulated leads to a drum recorder 15. A control connection shown as an electrical conductor 16 extends from drum recorder 15 to the servo control unit 17 of vibrator 11, which unit controls the application of power from a source 18 to vibrator 11 to actuate the latter in accordance with the form of input signals pre-recorded on drum 15 for playback and transmission over lead 16. As appears in the earth cross section, energy travels by paths 20 downwardly from vibrator 11 at surface 10 to be reflected by subsurface interfaces 21 and 22, respectively, back to detectors 12, 13 and 14. It will be recognized that this is a conventional seismic surveying setup, though, of course, each of detectors 12, 13 and 14 would in reality constitute a group of units spread over an appreciable area of the ground surface, and normally many more than three such units or groups would be laid out. The vibrator 11 is also primarily symbolic of any of a number of commercially available truck-mounted servo-controlled units, and furthermore more than one such unit may be employed simultaneously, all being controlled by the signal on lead 16. While I show operation of the source 11 on land, it will be understood that operation with sonic sources over water may also be used as is well known in this art.

Figure 2:
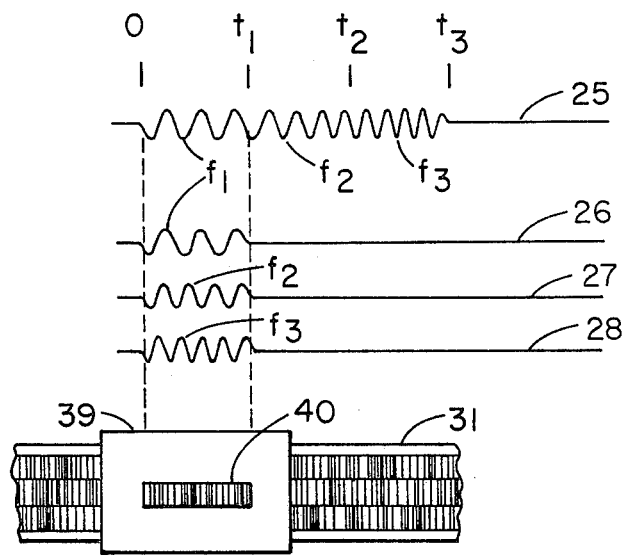
FIGURE 2 shows graphically the form of input signals preferred and their relationship to the analytical apparatus.

In accordance with the present invention, the vibrator 11, which may constitute a multiplicity of units, is supplied via lead 16 with control signals from drum recorder 15, of the form illustrated in FIGURE 2. Graphical trace 25, for example, is made up of three monofrequency, truncated wave trains in close succession, three being chosen for purposes of illustration to represent what will ordinarily be a larger number of different frequencies in actual field use. The lengthwise dimension of trace 25, as well as of traces 26, 27 and 28, represents time, the interval from time 0 to $t_1$ representing the period of introducing a constant frequency $f_1$, the succeeding time interval from $t_1$ to $t_2$ representing the time of introducing constant frequency $f_2$, and the next following interval from $t_2$ to $t_3$ representing the time of introducing the frequency $f_3$. Alternatively, these three frequencies may be introduced into the ground 10 by three vibrators simultaneously driven by the different monofrequencies as shown in traces 26, 27 and 28; or these three frequencies may be combined into one electrical control signal on lead 16 and applied to the single vibrator 11, assuming it to be a type of vibrator capable of sufficiently high frequency response to be able to follow the somewhat complex summation signal. As a further alternative, the three frequencies can be applied to a single vibrator, or to multiple vibrators, during time intervals which overlap or which may even be separated in time by intervals of quiescence. It is not essential but will usually be preferred that the range covered by the total of the different frequencies be less than one octave, to be sure that harmonics of the lower frequencies, which may occur due to distortion in the system or in the ground, will not coincide with the higher frequencies introduced, though this requirement may be relaxed if the specific frequencies chosen are such that the stronger harmonics of the lower frequencies are somewhat different from the chosen higher frequencies so that they do not actually coincide in a frequency analysis.

The specific frequencies $f_1$, $f_2$, and $f_3$ to be employed are chosen at least in part on the basis of the type of seismic data required, the transmission characteristics of the earth at the surveying location, noise-wave conditions, and like factors which affect or require specific frequency choices. That is, if reflections from deep subsurface interfaces are desired, lower frequencies such as those in the octave from 10 to 20 cycles per second may be preferred. For obtaining reflections of shallow interfaces or for resolving reflecting interfaces that are closely spaced in depth, higher frequencies such as those in the range from 40 to 80 cycles may be used.

The length of each of the different monofrequency trains is a matter of choice between the peak height of the spectrum characterizing each frequency and its time duration which affects the time resolution or the accuracy of timing of wave travel. Generally it will be found that from three to ten cycles of each of the different monofrequency truncated wave trains will be preferable for recognizing both the occurrence and the arrival time of the different monofrequencies in the received-wave trains. Further, it is preferred that the time durations of the monofrequency trains constituting one set of transmissions from a vibration point to a reception point be as nearly equal as possible, to within one cycle of each frequency.

Regardless of the form of record produced by the recorder 15, the received signals are ultimately put into the form illustrated in FIGURE 3, where the photographic transparency strip 31 bears the three variable-density traces 32, 33, and 34, respectively corresponding to the outputs of wave receivers 12, 13 and 14, recorded as functions of time. This FIGURE 3 shows the preferred form of analysis of the truncated monofrequency wave signals recorded as shown in FIGURE 1. Monochromatic light from a suitable source such as a laser 36, collimated into a parallel beam by a pinhole 37 at the focus of a converging lens 38, impinges on a mask 39 having an opening 40 in front of one of the traces, such as 33, of the record 31. As is made clear by the lower portion of FIGURE 2, the length of the aperture 40 coincides approximately with the time duration of each of the monofrequency input truncated signal wave trains, though it will be understood that if the transparency 31 represents a photographically reduced scale, the length of aperture 40 is reduced in proportion so as to span a time segment of the recorded traces 32, 33, and 34 corresponding to the time duration of any one of monofrequency trains $f_1$, $f_2$, and $f_3$ of traces 26, 27 and 28.

The light from laser 36, passing through aperture 40 and transmitted through and diffracted by the segment of trace 33, passes through a converging lens 41 to a transform plane at the focal length of the lens 41, at which plane is placed a mask 42. As is well known to those skilled in the arts of optical data analyses, the illumination in the transform at mask 42 comprises a central spot 43 representing undiffracted light passing through transparency 31, and varying illumination offset from spot 43 by increasing amounts corresponding to the successively higher spacial frequencies present in the variable-density trace at apertures 40. Precisely at the positions on mask 42 where frequencies $f_1$, $f_2$, and $f_3$ are presented in the transform are placed the respective small apertures 45, 46 and 47. Immediately behind apertures 45–47 is a strip of photosensitive film 48, movable lengthwise as suggested by the arrow 49 in synchronism with the lengthwise movement 50 of the film 31, by any suitable drive means 51.

FIGURE 4 represents in enlarged detail the appearance of the three variable-density traces respectively representing monofrequencies $f_1$, $f_2$, and $f_3$ after photographic processing of the film 48. Assuming that the input signal is that of trace 25 of FIGURE 2, a significant wave-travel time or arrival will be shown as density maxima on the three frequency-analysis traces lying along the oblique line 55. If, on the other hand, the three signals are simultaneously applied to the earth 10 as the traces 26, 27, and 28, then the density maxima will lie along a transverse line parallel to line 56 which is perpendicular to the edge of film 48. As will now be clear, any time pattern of introducing the multiple monofrequency wave trains produces a characteristic alignment across the frequency-analysis traces that is useful in recognizing a wave arrival and timing its travel.

The shape of each density maximum on the traces of film 48 depends on the length of window 40 relative to the recorded trace length of each monofrequency train, at the scale of record 31. As is shown by FIGURE 5, if the window and recorded train lengths are the same, the density varies as the solid-line graph 52, reaching a single clear maximum when the ends of the window and the ends of a recorded wave train coincide. If the window is shorter than the train, the density varies somewhat as the dashed line 53, while if the window is longer than the wave train, the density variation is about as represented by dot-dash line 54. As the maximum values of the latter two graph lines extend over an appreciable range of window positions, the time-resolution advantages of matching the length of window 40 to the monofrequency train length in the recorded traces as closely as possible, certainly at least within one cycle, seems apparent For a plurality of different monofrequency truncated wave trains, the recognition of significant arrivals is further assisted by a trace-summation step as illustrated by FIGURE 6. Here the film 48 bearing the three frequency-analysis traces $f_1$, $f_2$, and $f_3$ is illuminated by a beam from an ordinary light source 59, collimated by a lens 60. The light transmitted by the respective traces enters the ends of transparent light pipes or optical fiber bundles 61, 62, and 63, respectively, which join together at region 64. The illumination emerging from the output end 65 of the pipe or fiber bundle structure is then proportional to the sum of the illumination transmitted by the three traces, and exposes a corresponding variable-density summation trace 66 on a photosensitive medium 67 moved in synchronism with the scanning movement of film 48 by drive means 51.

As will be apparent, if the three frequencies are transmitted sequentially as in trace 25 of FIGURE 2, the scanning ends of pipes or bundles 61, 62, and 63 are aligned along the oblique line 55 shown in FIGURES 4 and 6, while if they are transmitted simultaneously as in traces 26, 27, and 28, the scanning alignment will be along a transverse line like 56. That is, any time pattern of introducing a plurality of different monofrequency wave trains has an analogous distribution of scanning means for the separate frequency-analysis traces to place all of the increased-density indicators of an event arrival in record-time coincidence for summation.

In a data display, if summation trace 66 represents the travel-time analysis of trace 33 corresponding to wave arrivals at detector (group) 13, then similarly derived adjacent summation traces would represent arrival times at detectors 12 and 14.

As was indicated briefly earlier, it should be emphasized that the use of three different monofrequencies is exemplary only, in that in some circumstances a single truncated wave train might be sufficient to determine wave travel times of interest, while in other cases a great many wave trains would be used and analyzed by the positions of a correspondingly greater number of scanning apertures like apertures 45, 46, 47 of the transform mask 42, there being in general one aperture for each different frequency. A corresponding plurality of scanning fibers 61, 62, and 63 would be so placed with respect to the other fibers as to match a recognizable alignment on the traces of record 48, and produce a maximum sum on trace 66. Although my invention has thus been described by reference to the foregoing specific details, it will be understood that even further modifications will be apparent to those skilled in the art, so that the scope of the invention should not be considered as limited to the described details but is to be ascertained from the scope of the appended claims.

I claim:
1. The method of seismic surveying which comprises the steps of:
   creating in the earth at a first location at least one truncated monofrequency seismic wave train,
   detecting at a second location spaced from said first location the resultant seismic waves which arrive there after travel by various paths through the earth,
   recording as a function of time said detected waves as a corresponding variable-density trace,
   traversing said trace lengthwise relative to a window mask having an opening substantially equal in length to the time duration of said wave train on said variable-density trace,
   illuminating the portion of said trace in said window with a parallel beam of monochromatic light,
   producing a Fourier transform of said illuminated trace portion, and
   recording, as a function of the relative position of said window along the length of said trace during said traversing step, an indication of the varying intensity of illumination in said transform only at the point which corresponds to said at least one monofrequency.

2. The method of seismic surveying as in claim 1 in which said seismic wave-creating step comprises:
   creating a plurality of truncated monofrequency seismic wave trains of similar time duration and each of a different monofrequency from the others, and said intensity-recording step comprises
   recording an indication of the varying intensity of illumination in said transform at each of the points therein corresponding to a respective one of said different monofrequencies.

3. The method of seismic surveynig as in claim 2 including the further step of:
   recording, as a function of the relative position of said window along the length of said trace during said traversing step, an indication of the varying total illumination in said transform at all of the points therein corresponding to all of said different monofrequencies in time synchronism.

4. The method of seismic surveying as in claim 2 in which said different monofrequencies lie within one octave.

5. The method of seismic surveying as in claim 2 in which said different truncated monofrequency wave trains are between about 3 and 10 cycles in length and are equal in time duration to within one cycle.

6. The method of seismic surveying as in claim 2 in which at least two of said different monofrequency wave trains are created substantially simultaneously.

7. The method of seismic surveying as in claim 2 in which at least two of said different monofrequency wave trains are created in a time sequence which produces a recognizable corresponding time-delay pattern in said recorded intensity indications for significant wave arrivals.

8. The method of analyzing a variable-density seismic data trace produced by transmitting, by various paths through the earth between two spaced locations, at least one truncated monofrequency seismic wave train which comprises the steps of:
   producing a relative lengthwise scanning movement of said trace and a window which spans a time segment of said trace equal in length to the duration of said wave train to within one cycle of said monofrequency,
   continuously optically producing a pattern of illumination representing the Fourier transform of said trace segment, and
   recording, as a function of the relative position of said window along the length of said trace, an indication of the variations in intensity of said illumination at the point in said transform corresponding to said monofrequency.

9. The method of analysis as in claim 8 wherein said data trace is one produced by transmitting a plurality of different monofrequency wave trains and said recording step comprises:
   recording, as a function of the relative position of said window along the length of said trace, an indication of the variations in intensity of said illumination at each of the different points in said transform corresponding respectively to each of said different monofrequencies.

10. The method of analysis as in claim 9 including the further step of:
   recording, as a function of the relative position of said window along the length of said trace, an indication of the variations in the total intensity of said illumination at all of said different points in said transform corresponding to said different monofrequencies transmitted in time synchronism.

References Cited

UNITED STATES PATENTS 3,300,753   1/1967   McCollum _____ 340—15.5

RODNEY D. BENNETT, Jr., Primary Examiner

C. E. WANDS, Assistant Examiner